US008487813B2

(12) United States Patent
Leiba et al.

(10) Patent No.: US 8,487,813 B2
(45) Date of Patent: Jul. 16, 2013

(54) ANTENNA ALIGNMENT METHOD AND APPARATUS

(75) Inventors: Yigal Leiba, Holon (IL); Baruch Schwarz, RaAnana (IL); Elad Dayan, Beit-Dagan (IL); Izhak Kirshenbaum, Rosh HaAyin (IL)

(73) Assignee: Siklu Communication Ltd., Petach-Tikva (IL)

( * ) Notice: Subject to any disclaimer, the term of this patent is extended or adjusted under 35 U.S.C. 154(b) by 340 days.

(21) Appl. No.: 12/475,625

(22) Filed: Jun. 1, 2009

(65) Prior Publication Data

US 2010/0302101 A1 Dec. 2, 2010

(51) Int. Cl.
*H04B 7/24* (2006.01)
*H01Q 3/00* (2006.01)

(52) U.S. Cl.
USPC ............................ 342/367; 342/359; 342/360

(58) Field of Classification Search
USPC .......................................... 342/359, 360, 367
See application file for complete search history.

(56) References Cited

U.S. PATENT DOCUMENTS 4,030,099 A * 6/1977 Valenti et al. ................. 342/426
4,696,053 A * 9/1987 Mastriani et al. .......... 455/67.16
5,551,058 A 8/1996 Hutcheson et al.
5,952,962 A * 9/1999 Dybdal ......................... 342/359
6,989,787 B2 * 1/2006 Park et al. ..................... 342/359
7,501,982 B2 * 3/2009 Charash et al. ............... 342/359
2002/0090941 A1 7/2002 Zhang
2002/0177405 A1 11/2002 Chedester et al.
2007/0066233 A1 3/2007 Smith et al.
2008/0088518 A1 4/2008 Charash et al.
2009/0033576 A1 2/2009 Smoyer et al.

FOREIGN PATENT DOCUMENTS

EP 1320145 6/2003
JP 2008-211358 9/2008

OTHER PUBLICATIONS

International Search Report and the Written Opinion Dated Oct. 21, 2010 From the International Searching Authority Re. Application No. PCT/IL2010/000434.
International Preliminary Report on Patentability Dated Dec. 15, 2011 From the International Bureau of WIPO Re. Application No. PCT/IL2010/000434.

* cited by examiner

*Primary Examiner* — Cassie Galt

(57) ABSTRACT

A method of automatic alignment of two directional beams having a known path attenuation, and an antenna gain pattern, for mutual transmission, comprises: determining a beam width between two angles of minimal detectable connection on either side of a beam maximum; then mapping points onto a scan field in a regular pattern, the pattern based on the beam width, such that a beam with the determined beam width is detected once if the beam is in the scan field at all; scanning the first antenna over the mapped scan points; and for each point allowing the second antenna to scan over all of its own set of mapped scan points, thereby providing a coarse alignment of the two antennas to achieve at least a minimal mutual connection. The coarse alignment may be followed by a fine alignment to maximize the signal.

11 Claims, 3 Drawing Sheets

ANTENNA ALIGNMENT METHOD AND APPARATUS

FIELD AND BACKGROUND OF THE INVENTION

The present invention relates to a device and method for antenna alignment, and more particularly to a method of antenna alignment which is useful inter alia for the backhaul connections in a cellular telephone network.

There are many methods used for antenna alignment and for an associated alignment mechanism. Some of them rely on geographical data, others rely on received signal level measurements and some incorporate motors in order to align the antenna. In most of the cases the antenna alignment solution is limited to the scope of one antenna to be aligned.

A relatively early example of automatic antenna alignment is illustrated by U.S. Pat. No. 5,551,058 assigned to Thomson Consumer Electronics Inc. Here a satellite receiver is aligned to a satellite. The receiver, which is for digitally encoded television signals, includes apparatus for aligning the receiving antenna to the satellite. The alignment apparatus is responsive to the number of errors contained in the digitally encoded television signals. Error correction is possible if the number of errors is below a threshold and not possible if the number of errors is above the threshold. The elevation of the antenna is set according to the location of the receiving site. Thereafter, the azimuth of the antenna is coarsely aligned by first rotating the antenna in small increments to locate a region in which error correction is possible. During this coarse alignment procedure, the tuner of the satellite receiver attempts to locate a tuning frequency at which demodulation and error correction is possible. If no appropriate frequency is found after a range of frequencies have been searched, the antenna is rotated by a small increment. Once error correction is found to be possible, a fine alignment procedure is initiated in which the antenna is rotated to locate boundaries of an azimuth are through which error correction is continuously possible. Thereafter, the antenna is set so that it is at least approximately midway between the two boundaries of the arc.

The satellite beam however is a broadcast beam and thus has a wide arc, which is intended to cover an entire region of television viewers. The automatic alignment based on error correction is not satisfactory when a narrow beam is being broadcast. Antenna alignment for narrow beam is known for beams below a certain frequency where the beam width is in fact not that narrow. Solutions based on GPS coordinates and on use of an optical gunsight are known. However the higher the frequency the narrower the pencil beam can be and existing methods of antenna alignment break down. At E-band frequencies, including frequencies of 71-76 GHz, which are of particular interest in the cellular backhaul field, there are no known automatic methods. Backhaul may be used for transmission of information between cellular base stations.

SUMMARY OF THE INVENTION

The present embodiments relate to automatic alignment of narrow beam transceivers, and the alignment comprises mutual searching by each of the transceivers using an efficient scan.

According to one aspect of the present invention there is provided a method of automatic alignment of a first directional beam antenna with a second directional beam antenna at a predetermined path attenuation each directional beam having an antenna gain pattern, the aligning being to provide mutual transmission, the method being performed at said first directional beam antenna, the method comprising:

determining a beam width of said directional beam antennas for said path attenuation, said beam width being between a first location of minimal detectable connection and a second location of minimal detectable connection, said first and second locations being on either side of a beam maximum in accordance with said antenna gain pattern;

mapping scan points onto a scan field in a regular pattern, said antenna gain pattern based on said determined beam width, such that a beam having said determined beam width is detected once if said beam is located in said scan field;

scanning said first antenna over ones of said mapped scan points; and at each point allowing said second antenna to scan over all of a respective second antenna set of mapped scan points to locate said beam, thereby providing a coarse alignment of said first antenna with said second antenna to achieve at least said minimal detectable connection.

In an embodiment, the method comprises carrying out said first antenna scanning using a steering unit controlled by a preset steering program.

In an embodiment, the method comprises feeding back signal quality metrics to said steering unit to continue said scan until said at least minimal connection is reached.

In an embodiment, the method comprises initiating said scanning using manual alignment of said antennas.

In an embodiment, the method comprises an additional fine alignment of finding said beam maximum.

In an embodiment, the method comprises feeding back signal quality metrics to said steering unit until said beam maximum is reached.

According to a second aspect of the present invention there is provided a method of automatic alignment of a first directional beam antenna with a second directional beam antenna at a path attenuation, each directional beam having an antenna gain pattern, the aligning being to provide mutual transmission, the method being performed at said first directional beam antenna, the method comprising:

determining said path attenuation, and a beam width, said beam width being between a first location of minimal detectable connection and a second location of minimal detectable connection, said first and second locations being on either side of a beam maximum in accordance with said antenna gain pattern;

mapping scan points onto a scan field in a regular pattern, the pattern based on said determined beam width, such that a beam having said determined beam width is detected once if said beam is located in said scan field;

scanning said first antenna over said mapped scan points and after each scan allowing said second antenna to move to another point of a respective second antenna set of mapped scan points to locate said beam, thereby providing a coarse alignment of said first directional antenna with said second directional antenna to achieve at least said minimal detectable connection.

In an embodiment, the method comprises carrying out said first antenna scanning using a steering unit controlled by a preset steering program.

In an embodiment, the method comprises initiating said scanning using manual alignment of said antennas.

In an embodiment, the method comprises feeding back signal quality metrics to said steering unit to continue said scan until said at least minimal connection is reached.

In an embodiment, the method comprises an additional fine alignment of finding said beam maximum.

In an embodiment, the method comprises feeding back signal quality metrics to said steering unit until said beam maximum is reached.

According to a third aspect of the present invention there is provided apparatus for automatic alignment of a first antenna with a second antenna, the antennas being directional beam antennas, the apparatus comprising:

a steering unit for steering said first antenna through a predetermined scan pattern;

a directional beam transmitting unit; and a received beam quality measuring unit configured to measure the quality of a received signal from said second antenna while said steering unit carries out said steering, said steering being continued through said predetermined scan pattern until a predetermined quality level indicating a minimal link with said second antenna is found.

In an embodiment, said steering unit is configured to steer said antenna through a fine tuning search to maximize said quality.

In an embodiment, said transmitting unit is configured to transmit an indication to said second antenna to signal corresponding alignment steering from said second antenna, thereby to mutually align said antennas by said maximizing of said quality.

In an embodiment, said directional beam antennas comprise pencil beam antennas.

In an embodiment, said directional beam antennas are configured for E-band transmission.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention relates to a device, system and method for antenna alignment, and more particularly but not exclusively to a method of antenna alignment which is useful for the backhaul connections in a cellular telephone network. Generally, directional beam antennas and pencil beam antennas are used for such connections. If millimeter wave bands are used then the directional antennas are likely to be pencil beam antennas. Pencil beams are particularly applicable to E-band frequencies.

The present embodiments may provide a device, system and method that enables optimal and efficient alignment of a pair of antennas used in a point-to-point terrestrial wireless communication link, in particular where the links are narrow beam links. The present embodiments may be used either in an open-loop fashion, where an external entity is used to steer the antenna beam, or in closed-loop mode where the system automatically steers the beam without any external entity.

The present embodiments may solve the problem of aligning two typically narrow beam antennas towards each other in such a manner that the alignment is optimal, that is to say the peak of the antenna gain of each antenna is aligned in the direction of the peer antenna. The problem becomes more severe as the antenna beam width becomes narrower, because there is no guarantee that there is enough signal power to establish a communication link between the antennas as long as they are not aligned closely enough. The algorithm minimizes the alignment time and enables fully automatic alignment of the antennas, without initially needing a communication channel between the two sides of the link.

The principles and operation of an apparatus and method according to the present invention may be better understood with reference to the drawings and accompanying description.

Figure 1:
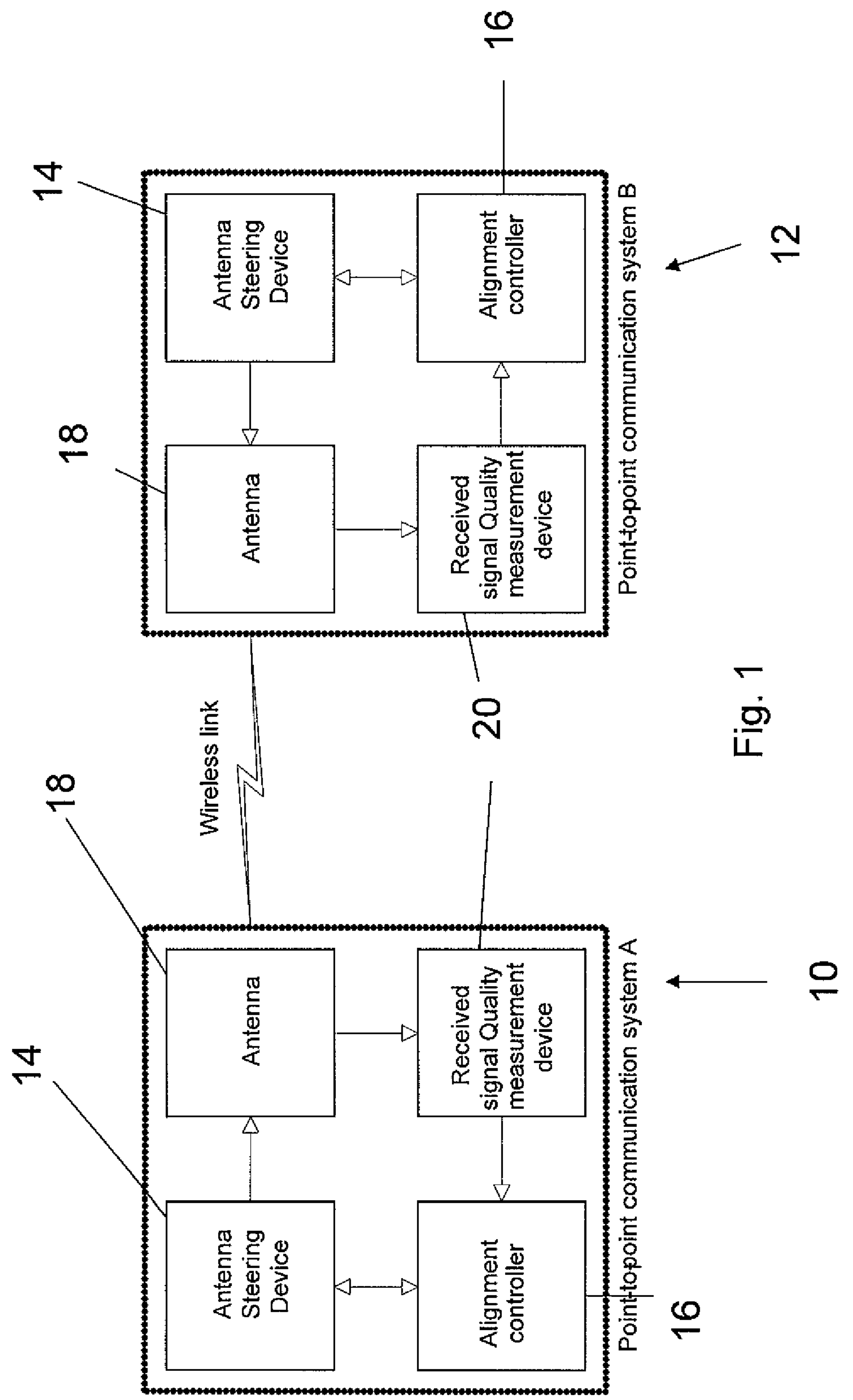
FIG. 1 is a simplified block diagram illustrating two antennas that need aligning according to the present embodiments.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Reference is now made to FIG. 1 which illustrates two point to point communication systems 10 and 12 that require automatic alignment of their respective point to point antennas, both antennas using narrow pencil beams. The system is particularly useful for millimeter wave bands, and in particular the E-band, which includes the 71-76 GHz, the 81-86 GHz, 92-95 GHz etc ranges, where the pencil beams are particularly narrow, making conventional manual methods ineffectual. The system is also applicable to the 57-66 GHz band.

Each system includes a steering unit, which in turn includes antenna steering device 14 for steering the respective antenna through a predetermined scan pattern, and an alignment controller 16 which controls steering. It is noted that steering may involve physical steering of the antenna or beam steering, or a combination of both.

A pencil beam transmitting unit includes the antenna 18 itself as well as associated electronics for forming the beam and modulating the signal onto the beam.

A received signal quality measuring unit 20 measures the quality of a received signal from the other antenna during the course of the scan so that the scan is continued, moved to fine tuning mode or ended as will be described in greater detail below. In general the scan and associated steering continues through a predetermined scan pattern until a predetermined quality level indicating a minimal link with the other antenna is obtained. Once the minimal link level is obtained then fine tuning is used to maximize the gain.

Parameters for the quality level include received signal level (RSSI), interference level, wireless channel quality, this latter typically measured by the variation of the channel across its bandwidth, and noise level.

The two antennas may transmit indications to each other to signal corresponding alignment steering. Thus one antenna may indicate to the other that it has found a minimal link and is now entering the fine tuning stage.

Figure 2:
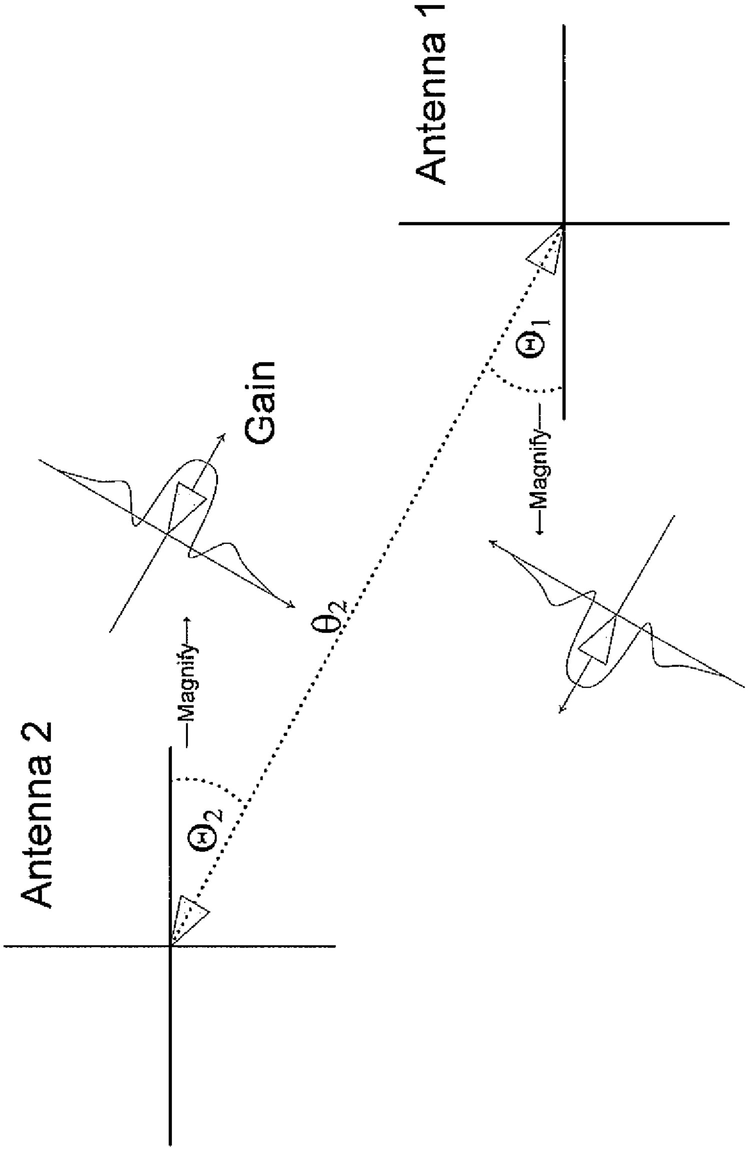
FIG. 2 shows a gain characteristic of the kind of beam that is being aligned, which characteristic is used to calculate the scan density according to the present embodiments.

Reference is now made to FIG. 2, which indicates an exemplary beam gain characteristic. Gain is shown against displacement across the width of the beam, which has a main section and two side lobes. The skilled person will appreciate that actual characteristics may vary, depending on particular reflector and feed configurations.

A first stage in aligning is to determine the width (typically as an angle) at the present antenna of a narrow beam transmitted by the other antenna. The beam width is calculated as the angular distance between a first position of minimal detectable connection and a second position of minimal detectable connection on either side of the beam maximum, the beam maximum being the point of maximal gain in the characteristic. It will be noted that other metrics can be used, and the situation in the figure is just an example. Then scan points are mapped onto a scan field in a regular pattern so that gaps between the scan points are just smaller than the calculated angle. The idea is to define a minimal number of scan points over the field such that the gaps between the points are just too small to hide the beam and the beam can be detected at one of the points. As long as the scan points are selected correctly a beam having the determined beam width is detected once. Generally the definition of scan points is calculated, as the antennas are not yet aligned. The calculation may be simply based on a knowledge of the other antenna's characteristic and the distance between the antennas.

Both antennas are then pointed towards each other, either manually or using Global Positioning System (GPS) data or a like method. The scan field covers the likely range from this initial alignment within which the other antenna is expected to lie. The antennas then scan over the mapped scan points under control of automatic steering, or alternatively manually. One of the antennas scans through all of the points slowly, giving enough time at each scan point for the other antenna to scan all of the points so that all combinations of scan points are covered. The scan is stopped as soon as a communication link is established (i.e. bi-directional signal transmission is possible) and therefore a coarse alignment is achieved.

Feeding back of signal quality metrics to the steering unit is used to determine whether to continue the scan or whether the coarse alignment has already been achieved. The feedback above may further be used in the fine alignment stage as well, wherein the latter may involve working from the connection already achieved along the characteristic gradient to the beam maximum gain. It may be appreciated that, aside from following the gradient, other methods can be used for the fine alignment stage, such as multivariate minimization methods well known in the art.

Returning to FIG. 1 and the system consists of two point-to point transceivers that need to be pointed at each other. Each transceiver is typically composed of the following components:

an antenna, as discussed, for example a directional antenna to transmit the wireless signal;

an antenna steering device may steer the beam of the antenna. Mechanical steering may be used to steer the antenna, or electronic beam shaping may be used to steer the beam directly.

a received signal quality measurement device, which measures the quality of the received signal, including parameters such as received signal level, interference level, wireless channel quality, and noise level; and an alignment controller which controls the antenna alignment process.

Figure 3:
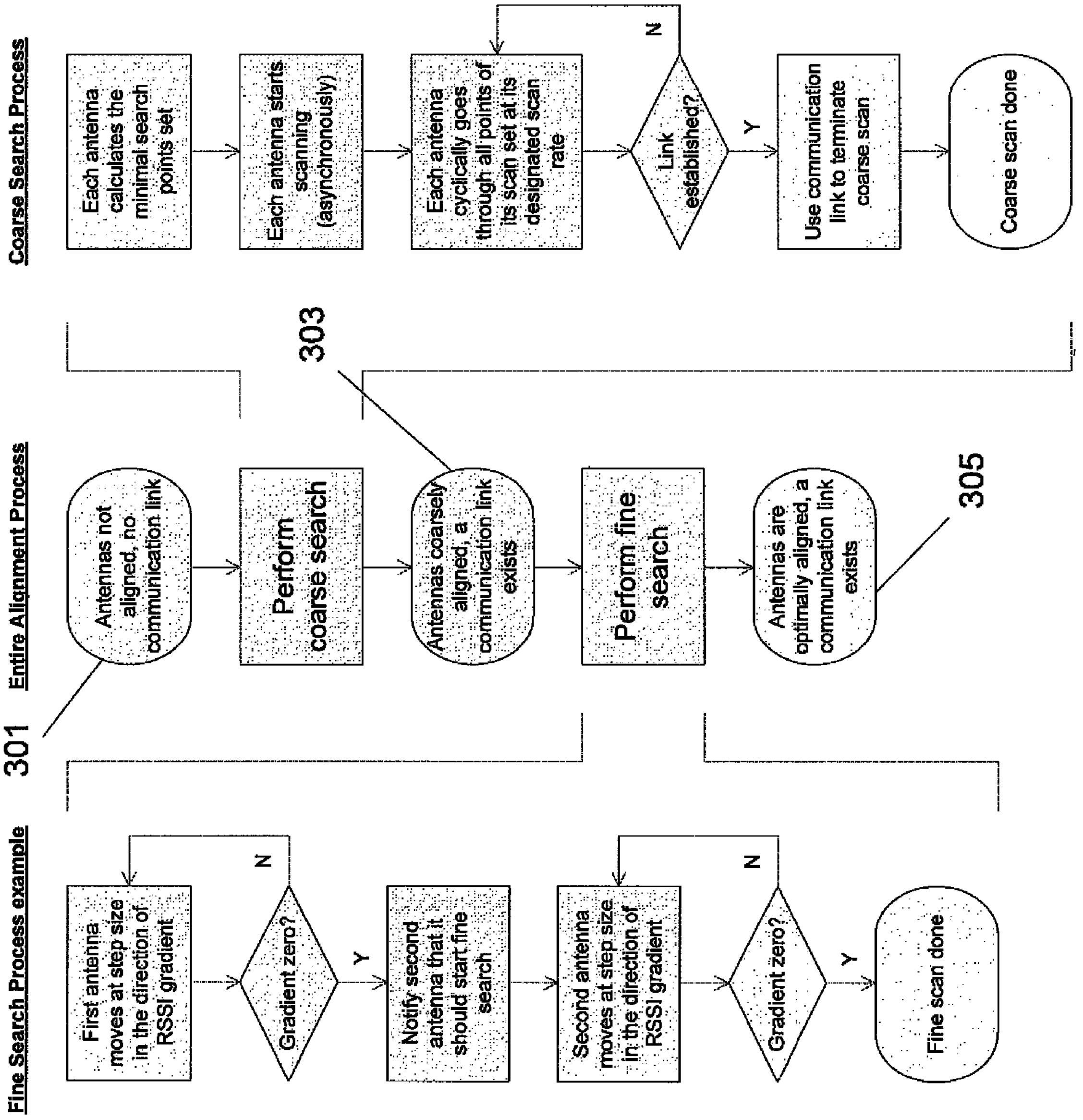
FIG. 3 is a simplified flow chart showing the overall automatic alignment process according to the present embodiments including coarse and fine scanning.

A method used for antenna alignment is now described with reference to FIG. 3.

Initially, the antennas are aimed in the general direction of the other system but not actually aligned. This may be done based for example on eye contact with the remote side, or alternatively by use of geographical positioning data available to the 'alignment controller' (i.e. geographic position of each point-to-point system, and aiming the 'antenna' with respect to the North in the azimuth axis and to the horizon in the elevation axis). Geographical positioning data may include satellite positioning data (e.g. GPS data) or map coordinates or the like. Eye contact may involve use of optical devices such as gunsights. At this point no communication link has been established,—box 301.

The alignment controllers at the system A and system B antennas initiate scans according to a typically predefined scan pattern using the antenna steering device as described hereinabove. This scan is performed while each system transmits and receives through the wireless link. In parallel, the received signal quality measurement device measures the signal quality of any received signal continuously during this scan. The quality measurements are used by the alignment controller to search for the alignment in which the signal quality is optimal. Initially the coarse search is performed to achieve a minimal or coarse alignment, box 303, and then a fine alignment is carried out in order to achieve a maximum possible gain or link quality, in box 305.

The coarse and fine searches are described in greater detail below.

The present embodiments use automatically controlled antenna steering devices together and at the same time to align the antennas.

An algorithm that uses knowledge of the scan boundaries and an antenna gain pattern optimizes the scan pattern.

A combination of signal quality metrics may be used to determine the best alignment. The metric or combination of metrics is fed back to the steering device.

Geographical position information and alignment direction measurements of each system may set the initial steering of the antennas towards each other.

The present embodiments relate to simultaneously aligning a pair of antennas. In the current art narrow band pencil beams require independent alignment activity at each antenna. The present embodiments may, as explained, make use of geographical positioning information if such is available, but this information is not necessary. The present embodiments may make use of several signal quality metrics, including but not limited to the received signal level, in order to determine the optimal alignment. The present embodiments may use antenna gain pattern information when such is available to optimize the scan pattern and shorten the scan time.

The present embodiments may be used to set up and align point-to-point wireless communication links using E-band frequencies and above, especially the 57-66, 71-76, and 81-86 GHz ranges, where pencil beams can be particularly narrow. The present embodiments are nevertheless applicable for point-to-point links at other frequencies as well.

The scanning algorithm makes use of the knowledge available regarding the antenna pattern, and the expected link budget to ensure a most efficient scan. We express the antenna gain patterns as a two dimensional function (in spherical coordinates) $P(\theta,\phi)$, where the function is typically expressed in dB, and the angles $\theta$ and $\phi$ represent the azimuth and elevation parameters. In the case of two antennas with patterns P1 and P2, we can define a measure of their combined gain, as a four parameter function. The function can be written as $$M(\theta_1,\phi_1,\theta_2,\phi_2)=P_1(\theta_1-\Theta_1,\phi_1-\Psi_1)-P_2(\theta_2-\Theta_2,\phi_2-\Psi_2)$$

In order to define the function, we use the two dimensional gain characteristic of FIG. 2, which relates to the azimuth plane. It is noted that a similar characteristic applies to the elevation plane, as the beam extends through three-dimensional space.

We define the parameters as follows, all angles being relative to the same coordinate system:

$\theta_1$—Orientation of antenna 1 in the azimuth plane $\Theta_1$—Direction of antenna 2 site, as seen from antenna 1 site, in the azimuth plane $\phi_1$—Orientation of antenna 1 in the elevation plane $\Psi_1$—Direction of antenna 2 site, as seen from antenna 1 site, in the elevation plane $\theta_2$—Orientation of antenna 2 in the azimuth plane $\Theta_2$—Direction of antenna 1 site, as seen from antenna 2 site, in the azimuth plane $\phi_2$—Orientation of antenna 2 in the elevation plane $\Psi_2$—Direction of antenna 1 site, as seen from antenna 2 site, in the elevation plane We note that the angles $\theta_1$, $\phi_1$, $\theta_2$ and $\phi_2$ are each limited between certain minimum and maximum values that define an overall search zone.

When the antennas are perfectly aligned, which we assume, without loss of generality, happens when $\theta_1=\Theta_1$, $\phi_1=\Psi_1$, $\theta_2=\Theta$2 and $\phi_2=\Psi_2$, we get the maximum value of M, which we call $M_{MAX}$. The calculation assumes that we have information about the link budget or about specific metrics such as radio path attenuation between the antennas, and the corresponding transmitter and receiver parameters at each side, that enable us to define the value $M_{MIN}$, which is the minimal value of M that will enable detection of a transmission from the transmitter by the receiver, and establishment of a bidirectional link. We further note that this value may be different for each direction of the link, in which case we may refer to the higher value of the two. The difference between $M_{MAX}$ and $M_{MIN}$ is the excess antenna gain in the link, and we shall call it EG.

At the first search stage, our objective is to arrive at a minimal set of different alignments for the two antennas. Scanning all the alignments in the set will enable us to find a much smaller set of points that are subjects for a second, optimization of fine search, stage. In order to define this set, we shall derive a function, Q, from the antenna pattern, $$Q_{\theta 1}(g)=\theta, \text{ where } \theta \text{ is defined by: } P_1(\theta_{MAX},\phi_{MAX})-P_1(\theta,\phi_{MAX})=g$$

where $\theta_{MAX}$ and $\phi_{MAX}$ are the angles which maximize P1. In a similar manner we will define the functions $Q_{\phi 1}(g)$, $Q_{\theta 2}(g)$ and $Q_{\phi 2}(g)$. We seek to maximize the expression $Q_{\theta 1}(g_1)\cdot Q_{\phi 1}(g_2)\cdot Q_{\theta 2}(g_3)\cdot Q_{\phi 2}(g_4)$ under the constraint $g_1+g_2+g_3+g_4=EG$. The set $g_1$, $g_2$, $g_3$ and $g_4$ which minimizes the expression will define the search step in $\theta_1$, $\phi_1$, $\theta_2$ and $\phi_2$, by lookup at the functions $Q_{\theta 1}(g)$, $Q_{\phi 1}(g)$, $Q_{\theta 2}(g)$ and $Q_{\phi 2}(g)$ (i.e., $\theta_1(\text{step})=Q_{\theta 1}(g_{1(MAX)})$). The search stage defined thus is a minimal set in the sense that it contains a minimal set of distinct points, of which mutual reception by both receivers will happen at the very least at one point.

The two ends may arrive independently at the same calculation results, particularly in terms of the scan pattern since they base their calculation on the same information, but the search may still be synchronized such that no point in the search is missed. Such synchronization may be done for example by one side of the link doing the search over its set of points slower than the other side, thus allowing the other side a complete scan of its set at each step.

In the coarse search itself each antenna may set up its mapping of the minimal search points. Each antenna starts scanning. One antenna may carry out many fast scans and the other a single slow scan so that all points are covered, as discussed in the discussion of the coarse scan above, until a link is established.

The established link is used to communicate the establishment of the link and end the scan at both antennas.

The two antennas then coordinate and the second, fine alignment stage is started as described herein.

At the second, fine alignment, stage of the search there is already an alignment with a mutual reception but not necessarily of the highest achievable quality. From this point on, the search can be conducted based on continuous signal variations, for example, using gradient methods. The first antenna moves at a given step size in the direction of increasing RSSI gradient. The first antenna continues to move until the gradient is zero. When the gradient is zero the first antenna notifies the second antenna and the second antenna in turn moves at the given step size in the direction of increasing RSSI gradient until the gradient is zero. When both the first and second antennas have achieved zero gradient then the maximum gradient is presumed to have been found.

It will be appreciated that the above is a simplified example, and the skilled person will be aware that other methods of fine searching are known, including those that are designed to avoid local maxima or similar fine searching issues.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of automatic alignment of a first directional beam antenna with a second directional beam antenna at a predetermined path attenuation each directional beam having an antenna gain pattern, the aligning being to provide mutual transmission, each directional beam antenna having first and second independent alignment angles respectively, the method being performed at said first directional beam antenna, the method comprising:

determining a beam width of said directional beam antennas for said path attenuation, said beam width being between a first location of minimal detectable connection and a second location of minimal detectable connection, said first and second locations being on either side of a beam maximum in accordance with said antenna gain pattern;

mapping scan points onto a scan field in a regular pattern, said pattern comprising a gap, the gap being set to correspond to said determined beam width; and scanning said first antenna over ones of said mapped scan points; and at each point allowing said second antenna to scan over all of a respective second antenna set of mapped scan points to locate said beam, thereby providing a coarse alignment of said first antenna with said second antenna to achieve at least said minimal detectable connection, the scanning further comprising an additional fine alignment of finding said beam maximum in terms of said two independent alignment angles at each of said first and second antennas, said fine alignment comprising feeding back a slope of a signal quality metric to a steering unit, and smooth following of said slope by said steering unit until a flat region in said slope is found to indicate that said beam maximum is reached.

2. The method of claim 1, comprising carrying out said first antenna scanning using a steering unit controlled by a preset steering program.

3. The method of claim 2, comprising feeding back signal quality metrics to said steering unit to continue said scan until said at least minimal connection is reached.

4. The method of claim 1, comprising initiating said scanning using manual alignment of said antennas.

5. A method of automatic alignment of a first directional beam antenna with a second directional beam antenna at a path attenuation, each directional beam having a first and second independent alignment angle respectively, each directional beam having an antenna gain pattern, the aligning being to provide mutual transmission, the method being performed at said first directional beam antenna, the method comprising:

determining said path attenuation, and a beam width, said beam width being between a first location of minimal detectable connection and a second location of minimal detectable connection, said first and second locations being on either side of a beam maximum in accordance with said antenna gain pattern;

mapping a plurality of discrete scan points onto a scan field in a regular pattern, said pattern comprising a gap, the gap being set to correspond to said beam width; and scanning said first antenna over said mapped scan points and after each scan allowing said second antenna to move to another point of a respective second antenna set of mapped scan points to locate said beam, thereby providing a coarse alignment of said first directional antenna with said second directional antenna to achieve at least said minimal detectable connection, the scanning further comprising an additional fine alignment of finding said beam maximum in terms of said first and second respective independent alignment angles, said fire alignment comprising feeding back a slope of a signal quality metric to a steering unit, and smooth following of said slope by said steering unit until a flat region in said slope is found to indicate that said beam maximum is reached.

6. The method of claim 5, comprising carrying out said first antenna scanning using a steering unit controlled by a preset steering program.

7. The method of claim 5, comprising initiating said scanning using manual alignment of said antennas.

8. The method of claim 6, comprising feeding back signal quality metrics to said steering unit to continue said scan until said at least minimal connection is reached.

9. Apparatus for automatic alignment of a first antenna with a second antenna, the antennas being directional beam antennas, the apparatus comprising:

a steering unit configured to steer said first antenna through a predetermined scan pattern, said predetermined scan pattern passing through a plurality of discrete scanning point, said discrete scanning points being located apart from each other at a gap corresponding to a beamwidth of a beam received at said first antenna, the beam being from said second antenna, the steering unit being configured to determine said beam width as extending between a first location of minimal detectable connection and a second location of minimal detectable connection, said first and second locations being on either side of a beam maximum in accordance with an antenna gain pattern;

a directional beam transmitting unit; and a received beam quality measuring unit, configured to measure the quality of a received signal from said second antenna while said steering unit carries out said steering, said steering being continued through said predetermined scan pattern until a predetermined quality level indicating a minimal link with said second antenna is found, said predetermined quality level comprising a minimum signal level that enables said first and second antennas to establish a bidirectional communication link, wherein said steering unit is configured to steer said first antenna through a fine tuning search to maximize said quality and wherein said transmitting unit is configured to transmit an indication to said second antenna to indicate a corresponding alignment steering to be carried out at said second antenna, thereby to mutually align said antennas by said maximizing of said quality.

10. The apparatus of claim 9, wherein said directional beam antennas comprise pencil beam antennas.

11. The apparatus of claim 9, wherein said directional beam antennas are configured for E-band transmission.

* * * * *